United States Patent
Hoghooghi et al.

[19]

[11] Patent Number: 5,959,260
[45] Date of Patent: Sep. 28, 1999

[54] METHOD FOR ENTERING HANDWRITTEN INFORMATION IN CELLULAR TELEPHONES

[75] Inventors: Michael Mehrdad Hoghooghi, Boca Raton, Fla.; Thomas Edward Buss, Madison, Ala.; John Lorne Campbell Seybold; Ronjon Nag, both of Palo Alto, Calif.; Elton B. Sherwin, Menlo Park, Calif.

[73] Assignee: Motorola, Inc., Schaumburg, Ill.

[21] Appl. No.: 08/650,663

[22] Filed: May 20, 1996

Related U.S. Application Data

[63] Continuation-in-part of application No. 08/504,971, Jul. 20, 1995, abandoned.

[51] Int. Cl.[6] .................................................. G08C 21/00
[52] U.S. Cl. .................................... 178/18.03; 178/18.06; 178/19.01; 178/19.03
[58] Field of Search .................................... 345/173, 179; 382/119, 187, 189, 313; 455/343, 127, 90, 556, 566, 575, 557, 572; 178/18.01, 18.03, 18.06, 18.07, 19.01, 19.03, 19.04, 19.05

[56] References Cited

U.S. PATENT DOCUMENTS

| | | | |
|---|---|---|---|
| 4,369,516 | 1/1983 | Byrns | 375/110 |
| 4,845,772 | 7/1989 | Metroka et al. | 379/61 |
| 4,972,432 | 11/1990 | Wilson et al. | 370/5 |
| 5,200,913 | 4/1993 | Hawkins | 345/179 |
| 5,237,651 | 8/1993 | Randall | 345/179 |
| 5,301,222 | 4/1994 | Fujiwara | 379/58 |
| 5,313,051 | 5/1994 | Brigida | 345/173 |
| 5,333,209 | 7/1994 | Sinden | 382/187 |
| 5,365,598 | 11/1994 | Sklarew | 178/18 |
| 5,389,745 | 2/1995 | Sakamoto | 178/18 |
| 5,401,916 | 3/1995 | Crooks | 178/18 |
| 5,465,401 | 11/1995 | Thompson | 379/58 |
| 5,541,985 | 7/1996 | Ishii | 379/144 |
| 5,584,054 | 12/1996 | Tyneski | 455/90 |
| 5,646,649 | 7/1997 | Iwata | 345/173 |

OTHER PUBLICATIONS

"Simon" by VBellsouth & IBM, pp. 1–10 Nov. 1993.

*Primary Examiner*—Vijay Shankar
*Attorney, Agent, or Firm*—Thomas G. Berry

[57] ABSTRACT

A cellular telephone (100) has a receiver (506) and a transmitter (508) and a detachable battery (106) retrofitted for entering handwritten information and for providing power to the cellular telephone (100). The detachable battery (106) has a digitizer (552) for accepting the handwritten information, a recognition engine (560), coupled to the digitizer (552), for generating readable characters from the handwritten information. The detachable battery also has a memory (558), coupled to the recognition engine (560), for storing the readable characters and an output port (116) for transferring readable characters from the detachable battery (106).

17 Claims, 4 Drawing Sheets

METHOD FOR ENTERING HANDWRITTEN INFORMATION IN CELLULAR TELEPHONES

This application is a continuation of Ser. No. 08/504,971, abandoned.

FIELD OF THE INVENTION

This invention relates in general to communication devices, and ore particularly to a battery for providing a method for entering handwritten information in a cellular telephone.

BACKGROUND OF THE INVENTION

The advent of cellular telephone heralds a new phase of two-way portable communication. However, while cellular telephone provides portable two-way communication, it brings a high economic cost for the convenience of being accessible in most geographic locations. Furthermore, because users of the cellular telephones have to pay the air time cost for all calls to and from their cellular telephones, there is no way to prevent indiscriminate calls apart from restricting the disclosure of their cellular telephone numbers or turning off their telephones which may cause them to miss important calls.

One attempt to solve this problem was to combine a cellular telephone with a selective call receiver (pager). With the combined cellular telephone-selective call receiver, the user may widely distribute the number for her selective call receiver while restricting the number to her cellular telephone. When paged, the user can then determine, from the telephone number or any accompanying messages, whether to call back on her cellular telephone. The combination cellular telephone/selective call receiver has separate receiving circuits so both receivers may operate, i.e., receive messages independent of each other or even simultaneously. Unfortunately, conventional cellular telephone has a limited power supply and under normal operating conditions is unable to provide a "talk-time" long enough for most users. The limited power supply of the battery is exacerbated when the cellular telephone is combined with the selective call receiver because both devices place a higher demand for power on the battery which already has an inadequately short "talk-time."

Furthermore, even with the combination cellular telephone/selective call receiver, the user may not be able to easily identifier the caller from the telephone number received on the selective call receiver. Also, requiring the user to restrict her telephone number defeats the purpose of owning a cellular telephone. Therefore, what is needed is a method and an apparatus for enabling a user to enter messages, annotations, or commands to associate with the telephone numbers of a caller, or to transmit a non-voice type message from a cellular telephone.

DESCRIPTION OF A PREFERRED EMBODIMENT

Figure 1:
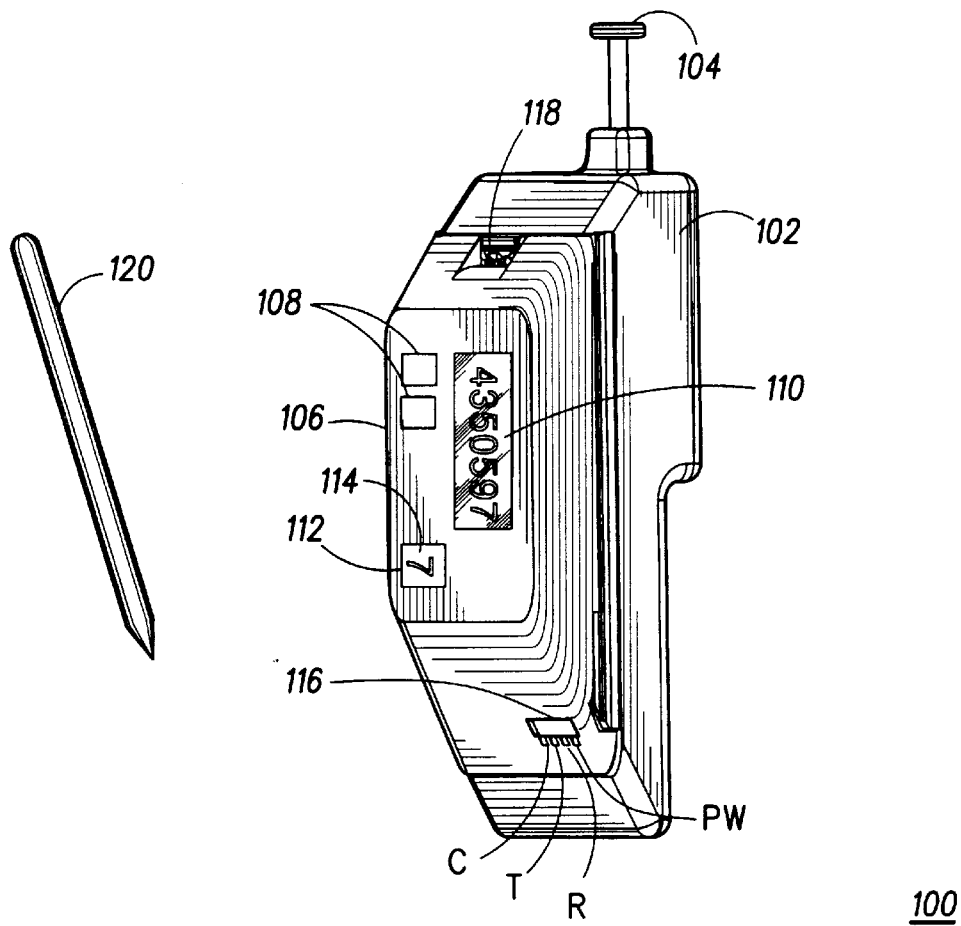
FIG. 1 is a perspective view of a cellular telephone with a battery having a digitizer in accordance with a preferred embodiment of the present invention.

Referring to FIG. 1, a cellular telephone is shown which has a battery comprising a digitizer in accordance with a preferred embodiment of the present invention. The cellular telephone 100 has a housing 102 and a retractable antenna 104 for receiving and transmitting communication to and from the cellular telephone 100. The battery 106 comprises a detachable battery 106 which is mechanically and electrically coupled to the housing 102 for providing power to the cellular telephone. An outer surface (or housing) of the detachable battery 106 similarly forms (or includes) a display 110 and the digitizer 112. A power supply (or power source) is enclosed within the detachable battery 106 to power the cellular telephone 100 including the digitizer 112, the display 110 and other electrical circuits enclosed within the battery 106. The digitized 112 enables a user to enter handwriting, gestures, commands, or annotations ("handwritten character(s)" or "handwritten information") into the cellular telephone 100 and the display 110 displays the handwritten information that was entered. Preferably, the digitizer 112 has a digitized area (or space) 114 preferably sized to accommodate or receive only one handwritten character at a time. The user uses a stylus 120 to write, for example the handwritten characters such as letters and numbers, within the digitized space 114 provided on the digitizer 112. The stylus 120 can be any one of the well known electronic pens known to one of ordinary skill in the art. The stylus may be a hard pen which compresses the digitizer to generate the characters being traced. With the stylus 120 in contact or in close proximity of the digitizer 112, each handwritten character is written in the same digitized area 114. The user delays, if necessary, a brief moment before writing the next handwritten character to allow the cellular telephone to retrieve each handwritten character. After the delay, the user continues to write each additional handwritten character in the same digitized area 114 until the message is generated, completed, entered or inputted. The handwritten characters are received (retrieved) and used to generate readable characters therefrom; the details will be discussed below. Control buttons 108 are incorporated on the surface of the battery to input control functions to the digitizer 112 and the other electrical circuits within the battery 106 in response to the entry of the handwritten characters or messages.

Mechanically, the display 110 and the digitizer 112 are positioned on and integrally coupled to the battery 106 with the digitizer 112 preferably located by the display 110. The control buttons 108 coupled to the battery 106 enable the user to control and to manipulate the messages received via the digitizer 112 to perform functions such as storing, retrieving, correcting and discarding, etc. The battery 106 further comprises an output port 116 for coupling the battery 106 to an external charger or for coupling the cellular telephone to peripheral devices. The output port 116 has a serial bus for data transfer and for providing access to the power supply. The bus has three lines, the first line, the T (true data) line, and the second lines, the C (complement data) line, are unidirectional lines and the third line, R (return) line, enable communication and data transfer between the cellular telephone and the digitizer 112 to be discussed in details below. A release button 118 is provided on the battery 106 for unlocking (detaching) the battery 106 from the housing 102 of the cellular telephone to permit the battery 106 to be decoupled and disconnected from the cellular telephone.

Figure 2:
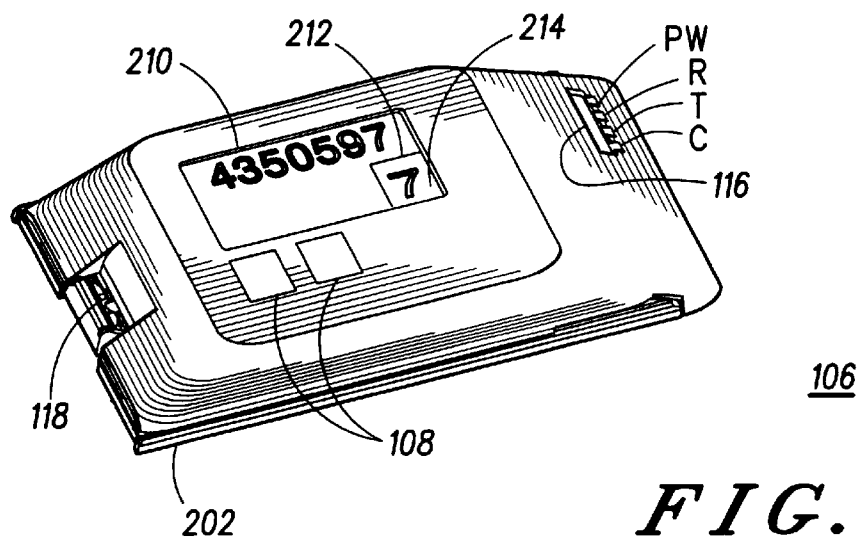
FIG. 2 is a perspective view of the detachable battery disconnected from the cellular telephone having the digitizer in accordance with a second embodiment of the present invention.

Referring to FIG. 2, a perspective view of the detachable battery disconnected from the cellular telephone having the digitizer in accordance with a second embodiment of the present invention is shown. In the second embodiment, the digitizer 212, similar to the digitizer 112 of FIG. 1, is positioned on (or located on or formed into a part of) the display or screen 210 instead of being located by or below the display 210. Interlocks 202 located on both sides of the battery couples the housing to the cellular telephone to permit attaching and detaching the battery to the cellular telephone. The interlocks 202 provide coupling to the power, PW, and the R, T, and C data lines of the battery to the housing of the cellular telephone.

Figure 3:
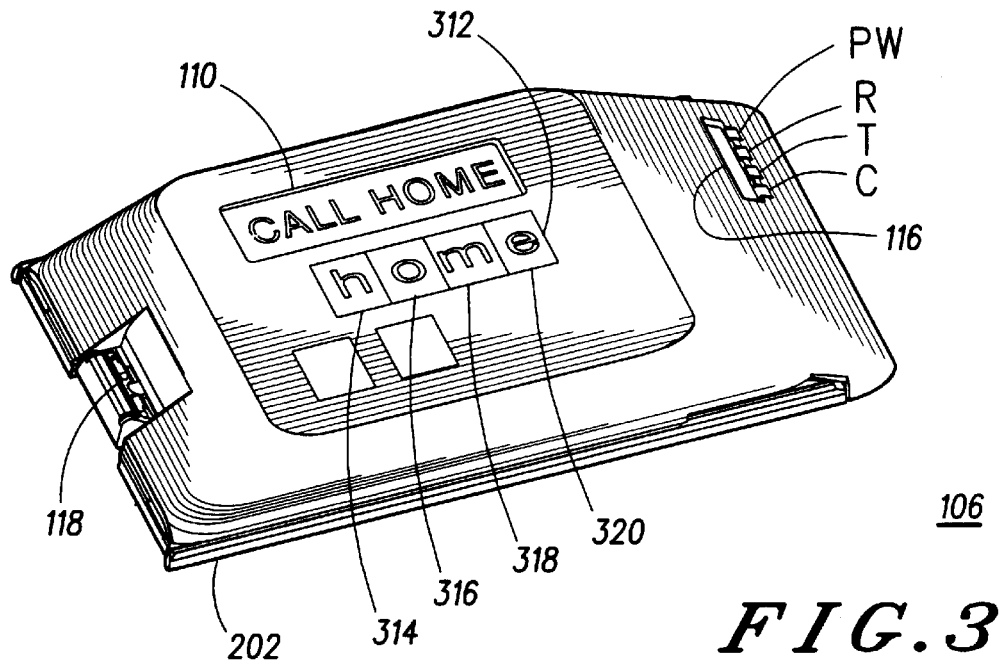
FIG. 3 is a perspective view of the detachable battery disconnected from the cellular telephone having the digitizer in accordance with a third embodiment of the present invention.

Referring to FIG. 3, a perspective view of the detachable battery disconnected from the cellular telephone having the digitizer in accordance with a third embodiment of the present invention is shown. In the third embodiment, the battery 106 shows the digitizer 312 located below the display 110; the digitized area 114, however, is divided into four digitized spaces 314–320, each digitized space is sized to accommodate or receive one handwritten character. The user therefore writes a handwritten character in each of the four digitized spaces 314–320 shown before repeating the sequence, e.g., handwritten characters are written in each of the four spaces 314–320 of the digitizer 312 consecutively in the sequence beginning with digitized space 314 and ending with digitized space 320. This sequence is repeated consecutively until the entire message is entered. The digitizer spaces 314–320 are identified or marked as a convenience to the user to promote accuracy.

Figure 4:
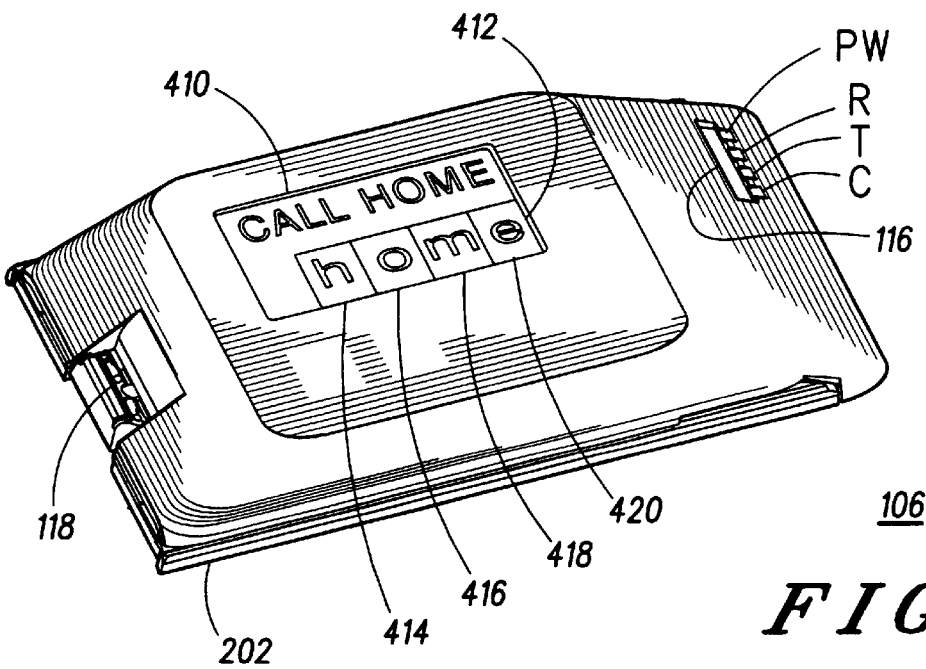
FIG. 4 is a perspective view of the detachable battery disconnected from the cellular telephone having the digitizer in accordance with a fourth embodiment of the present invention.

Referring to FIG. 4, a perspective view of the detachable battery disconnected from the cellular telephone having the digitizer in accordance with a fourth embodiment of the present invention is shown. In the fourth embodiment, the battery 106 comprises a digitizer 412 having its digitized spaces divided into four digitized spaces 414–420 similar to the digitizer 312 of FIG. 3, except that the digitizer 412 is positioned, located or formed into a part of the display or screen 410.

Referring to PIG. 5, an electrical block diagram of a cellular telephone and the battery having the digitizer in accordance with the preferred embodiment of the present invention is shown. The cellular telephone 100 comprises an antenna 502 coupled to an antenna switch 504 for switching between a receiver 506 and a transmitter 508. The transmitter 508 of the cellular telephone alternatively may be an acoustic or an infra red transmitter for downloading the handwriting information to an electronic device, for example a computer. A radio unit 530 has a microcomputer 510 coupled to the receiver 506, the transmitter 508 and an interface 514 via a self clocking serial data bus 512 which permits control signals and data signals to flow among the microcomputer 510, transmitter 508, receiver 506 and interface 514. The microcomputer 510 is also coupled to a memory 516 which, for example, includes a Read Only Memory (ROM) for storing subroutines which control the operation of the cellular telephone and a Random Access Memory (RAM) for storing variables derived during processing of the handwriting information or data received or data or information to be transmitted. A control unit 540 comprises the interface 514 coupled to a keypad 518 for receiving user responses via keystrokes, for example the dialing or initiation of a telephone call, which are passed from the interface 514 under the control of the microcomputer 510 to the transmitter 508. A display 520 is also coupled to the interface 514 for displaying information, for example, the telephone number entered on the keypad 518. An audio control 522 controls a speaker 524 and microphone 526 to permit two-way voice communication as is well known to one of ordinary skill in the art.

The interface 514 is coupled to the battery of the cellular telephone via the output port 116 which supports a power line, PW, a serial bus to be discussed below. The serial bus 116 is utilized as a serial communication interface (SCI) for example the MC68CH11 family of 8-bit microprocessor (or their equivalents). Such a bus is characterized by a standard non return to zero (NRZ) format (one start bit, eight or nine data bits and one stop bit) and meets the following criteria:

(1) The idle bit is brought to a logic one state prior to transmission/reception of a character.

(2) A start bit (logic zero) is used to indicate the start of a frame.

(3) The data is transmitted and received least significant bit first.

(4) A stop bit (logic one) is used to indicate the end of a frame. A frame consists of a start bit, a character of eight or nine bits and a stop bit.

(5) A break is defined as the transmission or reception of a low (logic zero) for at least one complete frame time.

The T (true data) and C (complement data) lines are unidirectional lines that go between the microcomputer 510 of the radio unit 530 via the interface 514 of the control unit 540 and from the radio unit 530 to communicate with external and other internal peripherals. The third line is the bidirectional R (return) line used by the microcomputer 510 and the control unit 540 and the peripherals to communicate with the radio unit 530 as well as other devices on the bus. Data is passed down the bus, with T and C setting up the timing. A more detailed description of the data format is shown in U.S. Pat. No. 4,972,432, "Multiplexed Synchronous/Asynchronous Data Bus" by Wilson et al which is incorporated as reference herein.

The battery of the cellular telephone, for example Motorola's MICROTAC™ cellular telephone, is retrofitted according to the preferred embodiment of the present invention to incorporate a recognition engine 560 which has a comparator 562 and a corrector 564. The recognition engine 560 and the cellular telephone are powered by the power supply 568 of the battery. The recognition engine 560 is coupled to a memory 558 and a digitizer 552 for entering handwritten information. A user of the cellular telephone retrofitted to accept handwritten information uses the stylus 120 to write handwritten characters on the digitizer 552. The digitizer 552 has at least one sensor 554 for inducing or generating a signal in response to a motion of the stylus 120 in contact with or in close proximity of the digitizer 552. The handwritten characters generated (traced or written) on the digitizer 552 are retrieved by the recognition engine 560. For example, the retrieved handwritten characters are compared with a template of a plurality of characters, numbers, etc., stored in the memory 558 for generating readable characters, the details will be discussed in below.

The recognition engine 560 in the battery is coupled to output port 116 of the cellular telephone by the two data lines labeled T (true data) and C (complement data) for enabling data transmission of, for example, readable characters to the cellular telephone that were entered on the digitizer 552. The output port 116 has four lines, the C, T, R and PW lines. The C, T and R lines and the power line, PW, of the output port 116 are coupled to the recognition engine 560 to provide data transfer and power. The recognition engine 560 can also receive data from the cellular telephone by coupling to the shared signal line labeled R (return data) in a manner well known to one of ordinary skill in the art. The return data signals transmitted by the cellular telephone on the return data line is transmitted in synchronism with the data signals received from the recognition engine 560 on the T (true data) and C (complement data) lines. When the handwritten information is received and the readable characters are generated therefrom, the readable characters are displayed on a display 570 to enable the user to visualize the information as it is decoded by the recognition engine 560.

In this way, when a user writes or enters handwritten information on the digitizer, readable characters are generated from the handwritten characters to form handwritten information and passed from the recognition engine 560 to the cellular telephone to be, for example, displayed on the display 520 or associated with a telephone number and stored in the memory of the cellular telephone. The user information may comprise a command that, when passed to the cellular telephone, instructs the cellular telephone to perform a given task or operation which includes, for example, dialing a telephone number or sending a page. Therefore, by retrofitting the battery of a cellular telephone to include a digitizer and a recognition engine and coupling the retrofitted battery via data lines C, T, and R, an existing cellular telephone is able to receive handwritten character via the digitizer incorporated in the battery. The user only needs to obtain a retrofitted battery with the digitizer and the recognition engine to be able to enter handwritten information to, for example, annotate messages or to command the cellular telephone to perform specific tasks.

Figure 5:
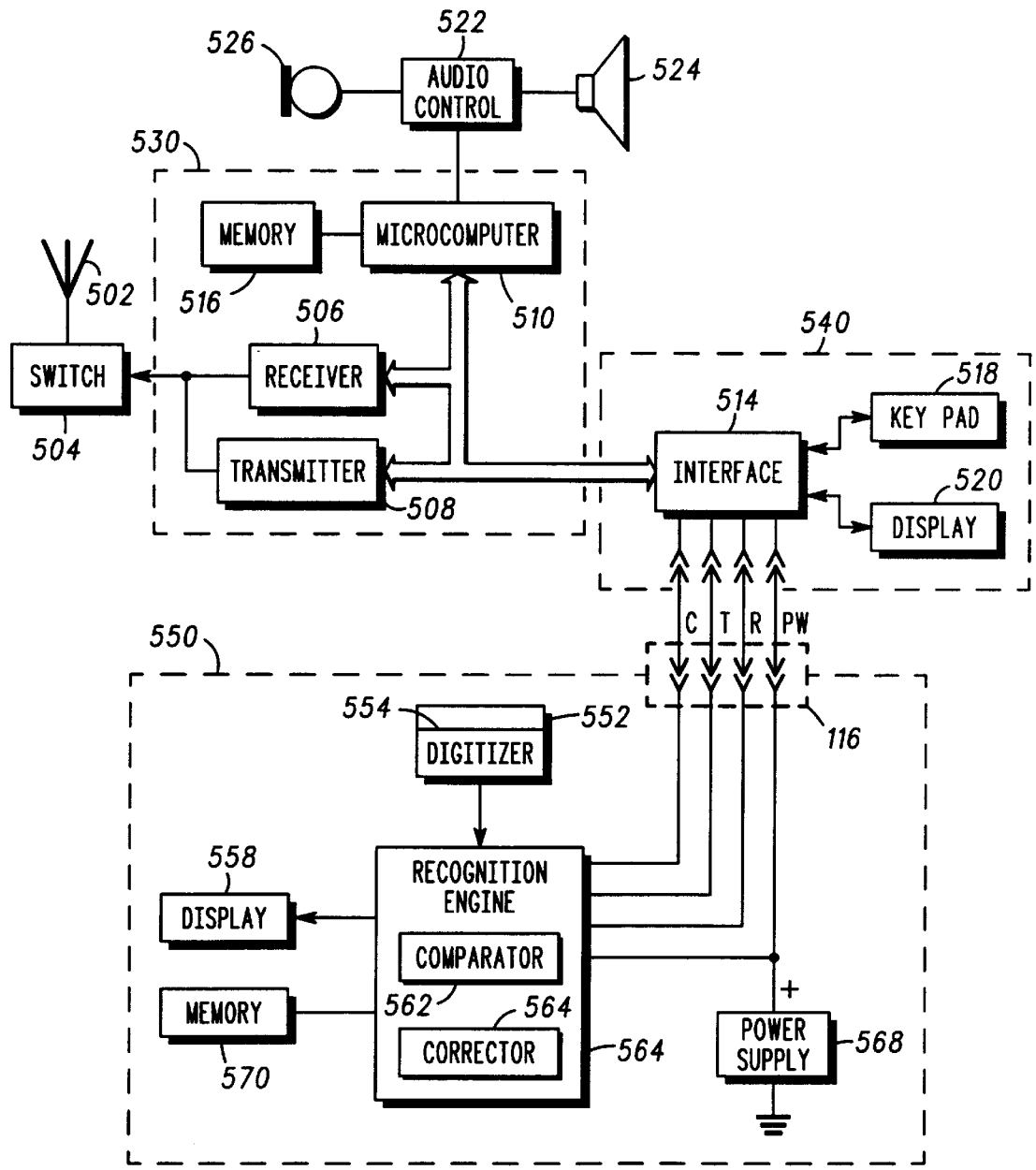
FIG. 5 is an electrical block diagram of the cellular telephone and digitizer coupled to the battery in accordance with the preferred embodiment of the present invention.
Figure 6:
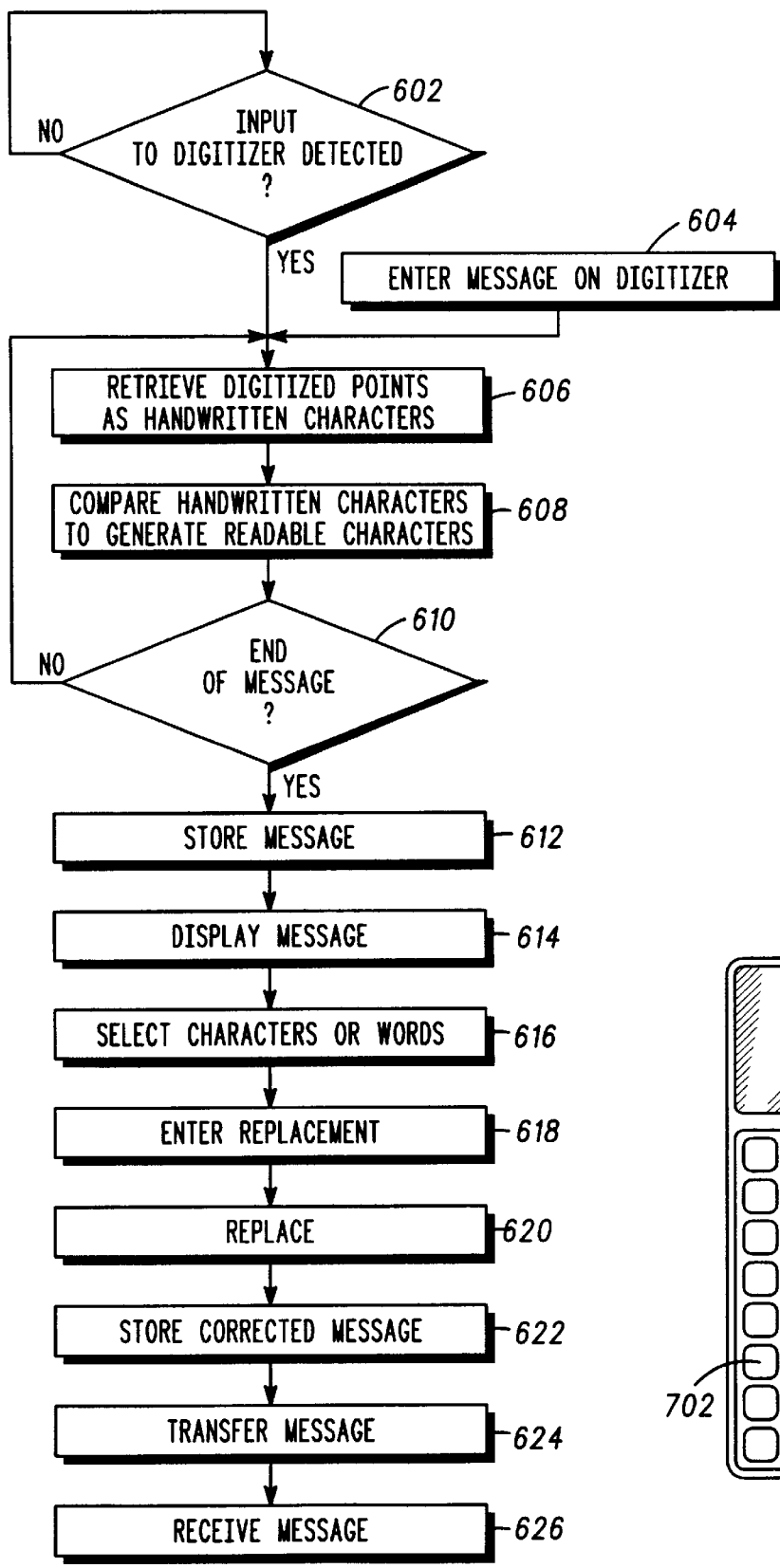
FIG. 6 is a flow diagram illustrating the operation of the cellular telephone and the digitizer coupled to the battery of FIG. 5.

Referring to FIG. 6, a flow diagram illustrating the operation of the cellular telephone according to FIG. 5 is shown. To enter handwritten information, the user uses the stylus to write or to enter the handwritten information (or characters) on the digitizer 552 located in the battery, step 604. Handwritten information may be entered electronically, such as by facsimile. It is appreciated by those of ordinary skill in the art that while a telephone conversation is in progress, the user may not easily enter handwritten information until the conversation is terminated. Therefore, it is preferred to enter a message or handwritten information via the retrofitted battery of the cellular telephone when a telephone conversation is not in progress. The recognition engine 560 checks to determine when handwritten information is being entered on the digitizer 552, step 602. If no input is detected, the process continues checking for the entry of handwritten information, step 602. However, when handwriting inputs are detected on the digitizer 552 at step 602, the handwriting inputs are captured by the digitizer 552 using a variety of technologies. For example, the position of the stylus (or pen) 120 can be detected at a rapid rate (for example, approximately 100 times per second) and stored as a sequence of (x, y) coordinates. The (x, y) coordinates are interpreted to determine the input to the digitizer 552. The digitizer 552, for example, comprises a sensor 554 to be used with a stylus 120 which tracks the motion of the stylus 120 across the digitizer 552, for example the stylus locally compresses points on the digitizing surface of the digitizer 552 upon contact thereto to induce a current or a voltage. Alternatively, a charged stylus (or pen) 120 on or within close proximity of a surface of the digitizer 552 covered with a material of known resistivity cause the generation a signal which is measured at the edges of the surface of the digitizer 552; or by using a stylus or pen 120 that emits Radio Frequency (RF) energy on a digitizer surface that detects the proximity of the RF energy.

With the stylus 120, the user enters or generates the handwritten characters (information or commands) in the digitized space 114 (or 214) or digitized spaces 314–320 (or 414–420) by tracing handwritten characters on the digitizer 552. The digitizer 552 tracks the motion of the stylus 120 across the digitizing surface and retrieves the handwritten characters or traced images which are passed to the recognition engine 560, step 606. The recognition engine 560 has, for example, a handwriting recognition algorithm which is used to identify the sequence of points captured by the digitizing component as a readable character or command that can be interpreted by the microcomputer 510, step 608.

According to the preferred embodiment of the present invention, a trainable, or user dependent, system is used, in which the user first enters several examples of each character to be recognized for training the system to recognize the user's handwriting. The samples are stored and passed through the recognition engine 560 which compares the input via the comparator 562 to generate samples which correspond to readable characters or commands. Once the samples are stored, the system uses the comparator 562 to compare new inputs with the stored samples to determine which characters were traced or written on the digitizer 552 in step 608. A trainable system allows high recognition accuracy to be achieved for a particular user. Alternatively, the entered samples, when retrieved, are compared against stored templates, e.g., readable characters. A third alternative method includes retrieving the entered handwritten characters which are processed by a neural network or other statistical mechanism to identify the output class to which they belong.

According to another embodiment of the present invention, recognition engine 560 does not need to be trained and may be user independent. Whether recognition engine 560 is user dependent or user independent depends upon the hardware and software of the recognition engine, or recognizer. Often, user independent recognition engines require more memory allocation than user dependent recognizers. A user independent recognizer will frequently recognize both block characters and stylized characters such as are found in both English and Chinese. User dependent recognizers are usually limited to distinct block characters. User independent recognizers may be used by any number of users whereas a user dependent recognizer is usually trained to recognize a single type of writing by one individual.

The process determines when an end-of-message is retrieved, which for example, could comprise a predefined stroke (command) entered by the user to signify the end-of message, step 610. The user can enter other gestures or strokes to generate digitizing components that can be used to control the device in a number of ways. The gestures can either be predefined, or trained as described above, to cause the cellular telephone to perform desired actions. For example, the user could enter the first few characters of a name stored in a directory memory, then write a circle to instruct the microcomputer 510 to retrieve the address from memory and transmit a handwritten message to that person. Another command gesture for example includes training the cellular telephone to perform a specific task when the user taps in a particular location on the digitizing surface of the digitizer 552. This allows the possibility of presenting more information to the user about available choices, freeing them from having to remember which buttons to press.

Once the end-of message is received, the handwritten message entered via the digitizer 552 is stored, step 612. The handwritten message is then presented on the display 570 to enable the user to view and to correct the message, step 614. By selecting, for example, by highlighting a character or a word of the message, step 616, the user can correct that character or word by enabling the corrector 564 which activates the digitizer 552 to accept other entered (accepting additional handwritten) characters or words on the digitizer (replacement characters), step 618, which is to replace the highlighted character or word, step 620. Therefore, the user is able to correct any error in the entered message once the corrector 564 is activated. The message is then stored in its final form as readable characters forming a handwritten message or command, step 622. The step of correcting the message is achieved by steps 614–622. The message can be transferred to the cellular telephone across the serial bus by toggling the appropriate lines of the output bus 116 known to those of ordinary skill in the art, step 624. The message or information is received and stored by the cellular telephone in memory 516, step 626. The information when received can be stored as profile information to associate with other subscriber information or to associate with a telephone number to identify the owner thereto. For example, by writing a few characters of a name and tracing the dial command (draw a circle) the cellular telephone is instructed to dial the telephone number associated with the name entered. This name can be retrieved later and used with other entered message to compose a message which can be transmitted from the cellular telephone, for example, to send a page to a selective call receiver. Alpha-numeric messages can be sent as pages to selective call receivers by writing the message onto digitizer 552 and sending the message as a page. Therefore, both the name, the command, and the message can be entered onto digitizer 552 and sent as a page. The handwritten information can also be a command or gesture to cause the cellular telephone to perform a specific task or operation.

In this way, the battery of a cellular telephone can be retrofitted to receive handwritten messages or commands from a user who uses a stylus to enter the handwritten message on a digitizer. Once the message is entered, the message is displayed and corrected by the user. The corrected message can be used to initiate a paging message or to annotate a stored message. Handwritten characters or gestures can be entered and used as commands to instruct the cellular telephone to perform predefined task. Therefore, the user is not limited to prestored (canned) messages or to manipulating keys which are too small to lend themselves to easy entry of information in a cellular telephone because retrofitting the battery to include a digitizer and a handwriting recognition system gives the user the option and ability to enter information, messages, and commands conveniently and easily. Furthermore, the user, being able to annotate his messages, can identify a caller by using CALLER ID™ to obtain a telephone number and associating the telephone number with the name of the caller to determine whether to answer or pick-up a call to his cellular telephone.

The present invention has been described above in terms of a preferred embodiment. Another embodiment of the present invention allows the digitizer 552 to be a part of the cellular telephone itself. Recognition engine 560 may also be designed within the cellular phone. For phones already in service, the preferred embodiment described above is ideal since a user may have handwriting recognition added to the existing phone by simply replacing the phone's battery with a battery 106 having a digitizer 552 and recognition engine 560. However, new phones may be more conveniently designed having handwriting recognition integrally incorporated within the phone.

Figure 7:
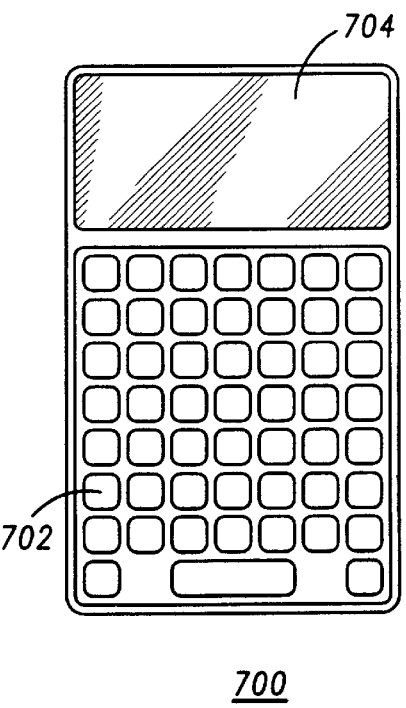
FIG. 7 represents a front view of a cellular telephone in accordance with a second embodiment of the present invention.

FIG. 7 shows a communicator 700, a second embodiment of the present invention with the handwriting recognition capability incorporated in the phone itself, having a communication device generally comprising a transmitter and a receiver where the communicator may be a cellular telephone or other device facilitating communication with other communication devices such as radios, cellular telephones or pagers. Communicator 700 has a keypad 702 and a digitizer 704. Digitizer 704 displays numbers and information entered in a conventional manner through keypad 702 as well as all other information generally displayed by conventional cellular telephones. Additionally, digitizer 704 receives written characters input to the surface of digitizer 704 using a stylus or other device used to input written characters to digitizer 704. A discussion of the method of entering information into a digitizer such as digitizer 704 is found previously in the description of the preferred embodiment.

Referring now to FIG. 5 and FIG. 7, the recognition engine, or recognizer for communicator 700 is, for this second embodiment, the micro-computer of communicator 700 (see FIG. 5, element 510). Writing recognition software is stored within memory (516 of FIG. 5) and accessed and executed by the micro-computer (510). Additionally, a set or sets of stored characters are stored in the memory (516). As written characters are entered to and received by digitizer 704, the micro-computer (510) is activated, either automatically or through a command, to run the writing recognition software stored in memory (516). The micro-computer (510) computes written data representing the written character(s) and compares the written data with the set or sets of stored characters to find the one or more characters which most closely represents the written character(s). The micro-computer (510) then outputs the most representative character(s) to digitizer 704 for display. Not only does this allow the user to view the results of the recognition process, it also allows the user to edit the results. In this second embodiment, the micro-computer (510) will output several characters to digitizer 704, and only the most representative character is displayed without further user input. The user may selectively view the other characters output by the microcomputer (510) in an editing mode to select one of the other characters to replace the character chosen by the writing recognition software and displayed on digitizer 704. The user may also choose to enter a different character by writing to the digitizer 704 if the micro-computer has not output the proper character within the list of selected characters.

The discussion of the second embodiment of the present invention has focused thus far on single character recognition. However, the second embodiment may easily extend to word recognition or even phrase or command recognition, depending upon the writing recognition software stored in the memory (516) and the amount of memory available. It should also be noted that the second embodiment of the present invention is not limited to any particular language. In fact, this second embodiment is well suited for Chinese character recognition where keyboard input is very cumbersome.

According to the description above of the second embodiment, a user inputs the written characters using a stylus or other device that can be tracked across the screen of digitizer 704. Such a device may be held by hand, or tracked across the screen in other ways. The written characters may also be input electronically to the micro-computer (510). For instance, written characters may be input to communicator 700 by facsimile or other electronic methods. The handwriting recognition software would then be activated within the micro-computer (510) and the recognized message displayed on digitizer 704. The message could then be edited, resent, used to activate functions of communicator 700, or stored.

Not only are the recognized characters, words, or phrases displayed on digitizer 704, they are also processed by the micro-computer (510) according to a number of functions. Use of the recognized characters, words, or phrases could include activating any of a set of commands, transmitting the characters, words, or phrases to another source, storing the characters, words, or phrases in memory, or displaying or editing the characters, words, or phrases as mentioned above.

Digitizer 704 need not necessarily be located in the display area of the communicator 700. Other locations may include the "flip" portion of flip-phones, the sides of the phone, or as described in the preferred embodiment above, on the battery, or power supply coupled to the communication device of communicator 700. Additionally, the recognition engine is not limited to the micro-computer (510) within the communicator (700) but may be a separate device within communicator (700).

Thus, what is claimed is:

1. A cellular telephone for entering written information, comprising:
    a receiver for receiving communication;
    a transmitter for transmitting communication;
    a detachable battery coupled to the receiver and transmitter which receives written information and provides power to the cellular telephone; the detachable battery comprising:
        a digitizer for accepting the written information;
        a recognition engine, coupled to the digitizer, for recognizing the written information to generate readable characters, words or phrases; and
        an output coupled to the recognition engine for outputting the readable characters or phrases.

2. The cellular telephone according to claim 1 wherein the digitizer comprises a sensor for tracking a motion of a stylus across the digitizer.

3. The cellular telephone according to claim 1 wherein the recognition engine further comprises a comparator for comparing the written information with a plurality of characters stored in a memory, the comparator generating the readable characters, words or phrases.

4. The cellular telephone according to claim 1 wherein the recognition engine further comprises a corrector for correcting the readable characters, words or phrases being entered.

5. The cellular telephone according to claim 1 further comprises a microcomputer for processing and associating the readable characters, words or phrases with a telephone number.

6. The cellular telephone according to claim 5 wherein the microcomputer composes a message with the readable characters words, or phrases, and the transmitter transmits the message as a paging message to a selective call receiver.

7. The cellular telephone according to claim 1 wherein the transmitter comprises an acoustic or infra red transmitter for downloading the readable characters, words or phrases to an electronic device.

8. A detachable battery for entering written information, comprising:
    a digitizer for entering the written information;
    a recognition engine, coupled to the digitizer, for generating readable characters, words or phrases from the written information; and
    an output port for transferring the readable characters, words or phrases from the detachable battery.

9. The detachable battery according to claim 8 wherein the digitizer comprises a sensor for tracking a motion of a stylus across the digitizer.

10. The detachable battery according to claim 8 wherein the recognition engine further comprises a comparator for comparing the written information with a plurality of characters in a memory for generating the readable characters, words or phrases.

11. The detachable battery according to claim 8 wherein the recognition engine further comprises a corrector for correcting the readable characters, words or phrases being entered.

12. A communicator for entering handwritten information, including handwritten characters and handwritten non-character gestures, comprising:
    a receiver for receiving communication;
    a transmitter for transmitting communication;
    a digitizer for accepting the handwritten information;
    a recognition engine, coupled to the digitizer, for generating readable characters from the handwritten characters and control commands from the handwritten non-character gestures;
    a memory, coupled to the recognition engine, for storing the readable characters; and
    a controller controlling the receiver or the transmitter responsive to the handwritten control commands.

13. The communicator according to claim 12 wherein the recognition engine further comprises a comparator for comparing the handwritten information with a plurality of characters and gestures in the memory for generating the readable characters and control commands.

14. The communicator according to claim 12 comprising a microcomputer that composes a message with the readable characters, wherein the transmitter transmits the message in response to one of the commands.

15. In a communicator having a digitizer for entering handwritten information including handwritten characters and handwritten non-character gestures, and a recognition engine for recognizing the handwritten information, a method comprising the steps of:
    (a) entering the handwritten information on the digitizer;
    (b) processing the handwritten information with the recognition engine;
    (c) generating, in response to the step of processing, readable characters from the handwritten characters and control commands from the handwritten non-character gestures;
    (d) storing the readable characters;
    (e) transferring the readable characters to the communicator; and
    (f) controlling the communicator in response to the control commands.

16. The method according to claim 15 further comprising the steps of:

composing a message with the readable characters; and transmitting the message in response to a control command.

17. The communicator according to claim 12, further comprising an output port for transferring the readable characters from the output port.

* * * * *